(12) United States Patent
Severin (10) Patent No.: US 11,126,339 B2
(45) Date of Patent: Sep. 21, 2021

(54) MOBILE COMMUNICATION DEVICE HAVING A USER INTERFACE DEPICTION ON THE BASIS OF A PARAMETER CAPTURED ON AN INTERFACE

(71) Applicant: TRIDONIC GMBH & CO KG, Dornbirn (AT)

(72) Inventor: Dieter Severin, Lustenau (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 35 days.

(21) Appl. No.: 16/085,010

(22) PCT Filed: Mar. 17, 2017

(86) PCT No.: PCT/EP2017/056356
§ 371 (c)(1),
(2) Date: Sep. 14, 2018

(87) PCT Pub. No.: WO2017/194230
PCT Pub. Date: Nov. 16, 2017

(65) Prior Publication Data
US 2019/0073116 A1    Mar. 7, 2019

(30) Foreign Application Priority Data

May 9, 2016    (DE) ..................... 10 2016 207 919.0

(51) Int. Cl.
G06F 3/0484    (2013.01)
G06F 3/0482    (2013.01)
(Continued)

(52) U.S. Cl.
CPC ........ G06F 3/04847 (2013.01); G06F 3/0482 (2013.01); H04L 12/2803 (2013.01);
(Continued)

(58) Field of Classification Search
CPC .. G06F 3/04847; G06F 3/0482; G06F 3/0488; H04L 12/2803; H04L 12/2816;
(Continued)

(56) References Cited

U.S. PATENT DOCUMENTS 9,918,180 B2 *   3/2018   Ribbich ............... H04W 4/021
2013/0117673 A1 *   5/2013   Hatambeiki ........... G08C 17/02
715/733

(Continued)

FOREIGN PATENT DOCUMENTS

DE   102014201467   7/2015
DE   102014009827   1/2016
(Continued)

OTHER PUBLICATIONS

Leeb et al., A Configuration Tool for HomeNet, Aug. 1996, IEEE Transactions on Consumer Electronics, vol. 43, No. 3, pp. 387-394. (Year: 1996).*

(Continued)

*Primary Examiner* — Jennifer N To
*Assistant Examiner* — Ashley M Fortino
(74) *Attorney, Agent, or Firm* — Andrus Intellectual Property Law, LLP (57) ABSTRACT

A system (100) comprising a mobile communication terminal (1) and a buildings engineering system GT is disclosed. The mobile communication terminal has a display unit (4) and an input unit (3), preferably a combined input and display unit (4), a near-field communication interface (5) and a control unit SE. The control unit SE is set up to use the near-field communication interface (5) to read at least one parameter P of the buildings engineering system GT and to provide said parameter for software application 6 executed by the mobile communication terminal (1), wherein the software application is designed to take the at least open (Continued)

parameter P as a basis for depicting a user interface (9) on the display unit (2) and to evaluate a user input on the user interface (9) via the input unit (3) and to send actuation data based on the user input to the buildings engineering system GT. The mobile communication terminal (1) is preferably a smartphone or a tablet. The software application (6) can access a data memory (8) that is provided either in the mobile communication device (1) or in a manner functionally connected thereto. The software application (6) preferably accesses a further communication interface (10) of the mobile communication device (1) in order to transmit actuation data to the buildings engineering system GT. The actual communication between the mobile communication terminal (1) and the buildings engineering system GT is preferably not effected by means of near-field communication, since this is used preferably only to read the available parameters for operating the buildings engineering system GT, particularly a light installation.

13 Claims, 1 Drawing Sheet (51) Int. Cl.
*G06F 3/0488* (2013.01)
*H04W 4/80* (2018.01)
*H04L 12/28* (2006.01)

(52) U.S. Cl.
CPC ......... *H04L 12/2816* (2013.01); *H04W 4/80* (2018.02); *G06F 3/0488* (2013.01)

(58) Field of Classification Search
CPC ........ H04L 12/28; H04W 4/80; H04W 12/04; H04W 12/08
See application file for complete search history.

(56) References Cited

U.S. PATENT DOCUMENTS

| 2015/0015165 A1 | 1/2015 | Engelen et al. |
| 2016/0234035 A1 | 8/2016 | Boeldt et al. |

FOREIGN PATENT DOCUMENTS

| WO | 2013132416 | 9/2013 | |
| WO | 2015039874 | 3/2015 | |
| WO | 2015113819 | 8/2015 | |
| WO | 2016001103 | 1/2016 | |
| WO | WO-2016083113 A1 * | 6/2016 | ............. H05B 47/19 |

OTHER PUBLICATIONS

German search report in priority German application 10 2016 207 919.0 dated Jan. 9, 2017.
International search report in parent PCT application PCT/EP2017/056356 dated May 15, 2017.
Austria search report in co-pending Austria application 3 GM 172/2016-1.

* cited by examiner

MOBILE COMMUNICATION DEVICE HAVING A USER INTERFACE DEPICTION ON THE BASIS OF A PARAMETER CAPTURED ON AN INTERFACE

CROSS REFERENCE TO RELATED APPLICATIONS

The present application is the U.S. national stage application of International Application PCT/EP2017/056356 filed Mar. 17, 2017, which international application was published on Nov. 16, 2017 as International Publication WO 2017/194230 A1. The International Application claims priority to German Patent Application 10 2016 207 919.0 filed May 9, 2016.

FIELD OF THE INVENTION

The invention comprises a mobile communication terminal, a building technology system, and a system comprising a mobile communication terminal and a building technology system.

BACKGROUND OF THE INVENTION

The point of departure for the invention is that remote controls are frequently used to control building technology systems, and lighting systems in particular, preferably in interiors (indoor areas), which fulfill different functions or can be specifically configured, depending on the building technology system used therein, or a specific region in a building, e.g. a room. This means that a user must first recognize and ascertain that the right remote control or control unit is available for the building technology system and/or the region in the building. The user must subsequently learn to operate the control unit.

The fact that different control units are provided for different building systems, and different control units are used within a building technology system is already problematic, because a user must adapt to a new control, or learn to use different control units, depending on the building technology system and/or the region within the building. This requires a training period for the user, and it may also result in operating errors on the part of the user.

SUMMARY OF THE INVENTION

The object of the invention is therefore to solve this problem in that a uniform user interface is provided on a communication terminal, which offers predefined functions, wherein these functions are implemented by a software application, for example, configured to the respective building technology system, or the specific region in a building.

For this, the mobile communication terminal records a parameter for one of its interfaces. Implementation of the control functions can be defined on the basis of this at least one recorded parameter. It is also possible that the functions, or control functions, are defined on the basis of the parameter, and the display and depiction thereof is based on the at least one recorded parameter.

The invention therefore provides a mobile communication terminal, a building technology system, and a system comprising a mobile communication terminal and a building technology system, as claimed in the independent claims. Further developments of the invention are the subject matter of the dependent claims.

A mobile communication terminal is provided in a first aspect of the invention, which has a display unit and an input unit, preferably a combined input/display unit, a near field communication interface, and a control unit, wherein the control unit is configured to read out at least one parameter of a building technology system via the near field communication interface, and to provide a software application executed on the mobile communication terminal, wherein the software application is configured to depict a user interface on the display unit based on the at least one parameter, and to evaluate a user input at the user interface via the input unit, and to send control data based on the user input to the building technology system.

The software application can provide functions for controlling the building technology system, which have different levels of complexity, in particular. The software application may depict the functions in groups by means of the user interface, preferably grouped according to their complexity, and preferably on numerous logical levels The software application can provide additional information regarding the functions. The software application can depict the additional information by means of the user interface, in particular in association with the functions for controlling the building technology system and/or in response to a user input.

The functions may create a scenario configuration that is to be modified and/or deleted.

The software application can evaluate user inputs via the input unit, and the provide the functions, or a portion of the functions, after evaluating a user input, in particular a predefined user input.

The software application can send the control data to the building technology system via at least one further communication interface of the mobile communication terminal, in particular a wireless communication interface.

The mobile communication terminal can have a memory, which can store user interface configurations. The control unit and/or the software application can call up at least one user interface configuration from the user interface configurations in association with the at least one parameter, and depict the user interface in accordance with the at least one retrieved user interface configuration.

The memory can store definitions for valid user inputs. The control unit and/or the software application can call up at least one defined, valid user input in association with the at least one parameter, and only send control data based on the at least one defined valid user input.

The control unit can automatically open the software application when it reads out the at least one parameter via the near field communication interface.

The software application can select the at least one further communication interface of the mobile communication terminal on the basis of the at least one parameter, and send the activation data via the at least one selected communication interface.

The software application can determine an address and/or a type of address for activating the building technology system on the basis of the at least one parameter.

The at least one parameter can define valid user inputs. The software application can depict the functions and accept inputs via the input unit only for the valid user inputs.

The software application can depict a type of remote control as the user interface based on the at least one parameter, which corresponds to a type of remote control provided for the building technology system, which can be identified in particular by the at least one parameter in the memory.

The software application can output sensor data by means of the user interface, based on the at least one parameter.

The control data can be configuration data, in particular for configuring actuators, sensors and/or bus subscribers of the building technology system.

The building technology system can be a light system and/or a lighting system. The near field communication interface can be an RFID and/or NFC interface. The at least one further communication interface can be a Bluetooth, WLAN, and/or Zigbee interface.

In a further aspect, a building technology system is provided, which has at least one near field communication interface, wherein the building technology system is configured to output in particular at least one, preferably modifiable, parameter of the building technology system via the at least one near field communication interface, a control unit, and at least one further communication interface, wherein the control unit is configured to control and/or configure the building technology system or a part thereof, in particular building technology system components, based on control data received via the at least one further communication interface.

The at least one parameter can identify the building technology system and/or the at least one further communication interface of the building technology system.

The building technology system can comprise sensors, actuators and/or bus subscribers serving as building technology system components, and the control unit can control and/or configure the building technology system based on the control data.

In a further aspect, a system comprising a mobile communication terminal and a building technology system like those described herein is provided.

BRIEF DESCRIPTION OF THE DRAWINGS

The invention shall now be described with reference to the FIGURE. Therein.

DETAILED DESCRIPTION

The building technology system provides a communication interface, e.g. in an entrance to a room, and preferably at a switch assembly, e.g. a light switch. The communication interface is preferably a wireless interface, in particular a Zigbee, Bluetooth, and/or near field communication interface (NFC, RFID). The communication interface is provided such that a user can communicate with a communication terminal therewith, in particular a smartphone, tablet, and/or notebook.

Thus, a parameter can be recorded when a near field communication interface has been provided, e.g. a smartphone, which is likewise equipped with an appropriate near field communication interface, through communication with the near field communication interface of the building technology system, when the smartphone is brought close enough to the near field communication interface of the building technology system, thus within range of a near field communication. The near field communication interface of the building technology system can be an RFID interface in particular. In particular, an RFID transponder may be provided, which outputs a predefined parameter when a mobile communication terminal enters the range of the near field communication for the transponder, and the mobile communication terminal executes a query by means of the near field communication interface of the mobile communication terminal.

A software application is installed on the mobile communication terminal, which evaluates the parameter obtained from the communication with the communication interface of the building technology system.

Data regarding at least one parameter of the building technology system, or a specific region in a building, is thus preferably read out and provided to the software application via a near field communication.

This has the advantage that the user can always execute a desired control in the same manner by means of the mobile communication terminal with a uniformly configured communication terminal, i.e. the smartphone with the software application, for example, independently of the concrete installation of the building technology system. The software application on the communication terminal can provide operating levels of different complexities, which can be configured based on the recorded, at least one, parameter, such that functions can be depicted on different visual levels, depending on their complexity. Thus, only simple functions may be available on a first level, e.g. switching on and/or off, dimming, and/or other basic settings of components of the building technology system (such as lamps, sensors, actuators, (e.g. motors), switchable sockets, . . . ), while in other, "deeper" levels, more complex functions, or control functions, such as programming and instructions, can be input to the building technology system. Sensors or other components of the building technology system can thus be configured, for example. Components of the building technology system include, in particular, bus subscribers of the building technology system and/or building technology devices, preferably bus subscribers of a lighting system.

It is also possible to retrieve parameters of the components of the building technology system via the software application. By way of example, sensors or bus subscribers can thus be evaluated regarding when they have recorded a specific event, when a specific function has been executed, and/or which control parameters have been triggered, set, and/or recorded over a specific time period. It is thus possible, for example, to evaluate the number of recorded detections by a motion or presence detector.

The actual communication between the mobile communication terminal and the building technology system preferably does not take place, however, by means of the near field communication, because this is preferably used only for reading out the available parameter for controlling the building technology system, in particular a light installation. The communication takes place instead "out-of-band," preferably in a wireless manner, via communication technologies such as Bluetooth, WLAN, or Zigbee, for example. It should be understood thereby that communication parameters, for example, necessary for out-of-band communication are likewise transmitted by means of the near field communication between the mobile communication terminal and the building technology system. Furthermore, the software application can be opened, in particular automatically, when the mobile communication terminal enters into near field communication with the building technology system.

Likewise, the type of activation can be transmitted by the parameter recording via the near field communication interface, i.e. data is then also transmitted to the mobile communication terminal, regarding which type of a further communication channel is to be selected, which addressing is necessary, as well as data regarding which components of the building technology system are to be activated via the further channel, in order to obtain the appropriate control of the building technology system. For this, address data and activation parameters can be transmitted, for example. It should also be understood that a memory in the mobile communication terminal can store parameters in the software application, or functionally connected thereto, which can be retrieved and interpreted by the software application, and evaluated in association with parameters recorded via the near field communication interface. The software application can then likewise depict the user interface depicted to the user on the basis of this parameter.

By way of example, a scenario control for lighting and light installations can be retrieved and graphically displayed, simulated and explained via a user interface, depicted by the software application on the mobile communication and the display unit connected thereto. In particular, explanations can be provided for all of the functions depicted by the user interface. The user can thus be informed of the exact functioning of the various functions, unlike with normal remote controls, and a "trial and error" approach is no longer necessary.

The software application can also first make certain functions available after entering authorization data, in particular a password. After entering the authorization data, one or more functions are then depicted or made accessible by the user interface. Certain functions of the software application can then be made accessible to the user on the basis of the authorization data. In particular, these may be special configuration functions and calibration functions that are only to be executed by specific users or the personnel of the manufacturer of the building technology system.

If, for example, a communication interface for near field communication is provided close to a switch for the building technology system, a site-specific parameterization by the software application can take place. This has the advantage that—in comparison with a localization via WLAN or other wireless technologies—it is ensured that the parameterization is only carried out for a specific region of a building. In particular, a WLAN signal may reach numerous regions in a building. In this case, a site-specific parameterization is not possible, e.g. for specific spaces.

Furthermore, a site-specific parameterization can also take place in a fine-grained manner. By way of example, interfaces for near field communication may be provided at workspaces or in special regions of a room, which provide specific parameters, which only control specific components of the building technology system. Thus, the lighting control of workspaces can be controlled on the basis of parameters output via the respective communication interfaces of the building technology system. This can take place, in particular, in that the parameter transmitted via the near field communication interface has an identifier, e.g. an address, which identifies one or more specific components of the building technology system, and only allows activation of these components.

The specific goal is activation of lighting units and lighting components of a building technology system. In particular, the parameter thus has at least one identifier for individual lamps, or groups of lamps, lighting units and/or bus subscribers in a building technology system. The at least one recorded parameter is thus preferably a parameter for a lamp, lighting, and/or bus system.

Figure 1:
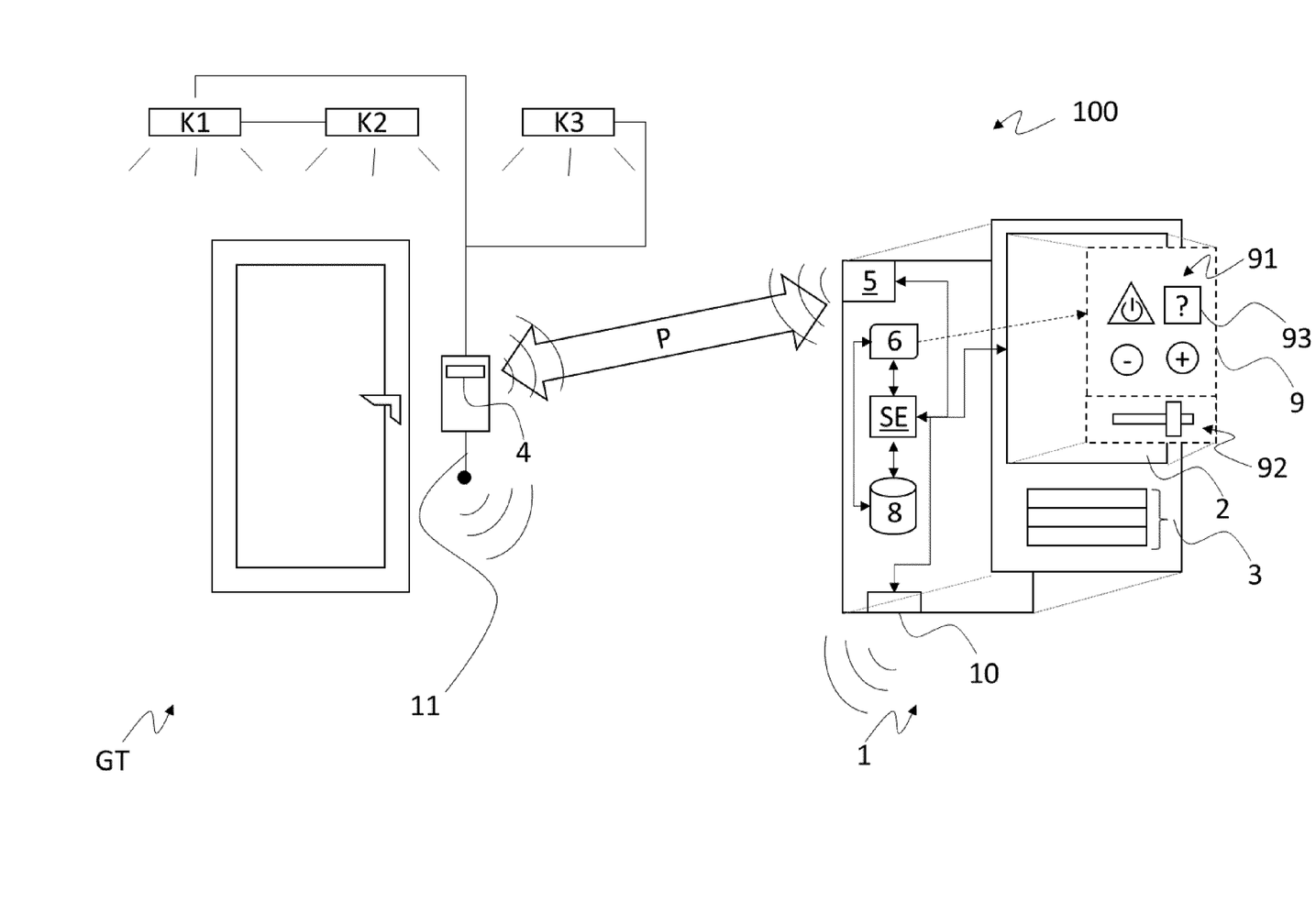
FIG. 1 schematically shows a communication terminal, a building technology system, and a system according to the invention.

FIG. 1 first shows a mobile communication terminal 1, which has a display unit 2 and an input unit 3. The mobile communication terminal 1 is preferably a smartphone or tablet. The display unit 2 is preferably a display, e.g. an LCD, IPS, or ePaper display. The input unit 3 can be a touchpad, a keyboard, an input pen, a mouse and/or a trackpad, for example. It should also be understood that the display unit 2 and the input unit 3 can also be combined to form an input and display unit, e.g. in the form of a touch-sensitive display (touchscreen).

The communication terminal 1 also has a control unit SE, which is used to execute the near field communication with a communication interface 4 of a building technology system GT, among other things. For this, the control unit SE communicates with the communication interface 4 of the building technology system GT via a near field communication interface 5 of the mobile communication terminal 1. The control unit SE reads out at least one parameter P of the building technology system. This parameter P, which is received via the preferably wireless near field communication interface 5 of the mobile communication terminal 1 is then sent to a software application 6, which is executed by the mobile communication terminal 1, or the control unit SE, respectively.

The software application 6 can access a data storage unit 8, which is either provided in the mobile communication terminal 6, or functionally connected thereto. By way of example, this data storage unit can be implemented on a remote computer system, e.g. as a cloud memory. The software application 6 is also configured to depict a user interface 9 on the display unit 2 on the basis of and depending on the at least one recorded parameter P, and to evaluate a user input at and/or for the user interface 9 via the input unit 3.

Based on the input, the control unit SE then transmits control data to the building technology system. It should be understood thereby that the control unit SE can also be comprised of numerous processing unit, or processors. Thus, various types of processors and control circuits (microprocessors, ICs, ASICS) can be provide, which can also process and exchange data in parallel thereto. Not every control unit needs to process and/or execute the inputs and outputs and recording operations of the mobile communication terminal. Individual components of the control unit SE may be provided only for executing specific tasks.

The software application 6 provides various functions 91, 92 for controlling the building technology system GT. The complexity of the depicted and provided functions can be depicted in particular such that they are organized or categorized according to their complexity or according to a predefined weighting. Functions can thus be disposed, e.g., on numerous logical levels of the user interface. A user can move, for example, from one logical level to another through an input motion. The logical levels can be linked to one another, or provided such that they can be retrieved individually. In addition, it may be provided, as stated above, that certain functions 92 can only be unlocked after authorization, e.g. after entering an ID, an identifier, a password, an encrypted key, etc. In particular, it may be provided that the specific functions 92 are first unlocked after they have been unlocked by an external source. It can thus be provided, for example, that certain functions 92 are first unlocked when the software application carries out authorization with a remote system. This can be a confirmation of a counting operation, by way of example.

The software application 6 is preferably also configured to depict supplementary information on the functions. The software application 6 can access the data storage unit 8 for this, and thus retrieve data in association with the functions 91, 92, and depict these data on the user interface 9. In particular, it is provided that auxiliary functions 93, such as explanation and/or auxiliary texts, animation, or other media content, are depicted and retrieved, which clarify the functioning of the functions and their effects. For this, the software application 6 can also read only query addresses (e.g. web addresses) from the memory, and then retrieve the content identified by the query addresses from an external system. The media content, or auxiliary texts and other content can then be displayed on the display unit 2 in response to a user input.

In particular, the software application 6 depicts inputs and control elements via the user interface 9 that enable a scenario control, planning, modification and/or setting. The software application 6 can evaluate, execute and/or store inputs via the input unit 3 with respect to the user interface 9, and transmit the inputs and/or stored content, or the data stored in the data storage unit 8 in association with these inputs, to the building technology system GT. In particular, it is possible to create, modify or delete scenario configurations. The software application 6 thus evaluates user inputs at the input unit 3.

The software application 6 preferably accesses a further communication interface 10 of the mobile communication terminal 1 in order to transmit control data to the building technology system GT. Thus, components K1, K2, K3 of the building technology system GT are activated via a further, preferably wireless, communication channel.

The data storage unit 8 is configured in particular to also store a user interface configuration. The control unit SE and/or the software application 6 can then retrieve a user interface configuration from a number of different user interface configurations based on the recorded parameter P, and depict the user interface 9 in accordance with the selected user interface configuration. It is further provided that a user can also select a user interface configuration by means of an input. For this, menu options can be provided, for example, which a user can select accordingly though a user input.

Furthermore, the memory 8 is configured to store definitions for valid and/or invalid user inputs. The control unit SE and/or the software application 6 then select at least one defined valid user input based on the recorded parameter P, or they retrieve it from the memory unit 8. The control unit SE, or the software application 6, then checks user inputs to determine whether they are valid or invalid. Invalid user inputs can then be deleted.

Furthermore, functions 91, 92 can be depicted on the user interface 9 based on the valid user inputs. In particular, it is possible to depict only those functions 91, 92 that are defined by the (potentially) valid user inputs. On the other hand, it is also provided that the software application 6 and/or the control unit SE check which control data have been transmitted to the building technology system GT on the basis of the valid and/or invalid definitions, before sending the control data. In particular, only those control data that correspond to valid user inputs are transmitted.

The control unit SE is configured in particular to automatically open the software application 6 when it records predetermined parameters P via the near field communication interface 5 of the communication terminal 1.

The parameter P can be an identifier, a serial number, and/or a MAC address, in particular. The at least one Parameter P can contain data in particular, regarding which further communication channel is to be selected. Data regarding the building technology system GT can also be requested from a remote system, e.g. a server connected to a network, by the control unit SE and/or the software application 6 using the parameter P. This can take place using the further communication interface 10, e.g. a WLAN, GSM, LTE, Zigbee, Bluetooth, Ethernet, and/or another wire-connected or wireless interface.

The software application 6, or the control unit SE, is then able to select the at least one further communication interface 10 of the mobile communication terminal 1 on the basis of the at least one parameter P and the data transmitted therewith, and send the control data via the at least one further selected communication interface 10.

Based on the at least one parameter P, the software application 6 and/or the control unit SE can determine an address and/or a type of addressing for activation the building technology system GT. This address and/or type of addressing is then used to control the building technology system GT based on the user inputs regarding the depicted functions 91, 92. The building technology system GT is a lighting system in particular. Specifically, lighting parameters are transmitted to the building technology system GT, in order to adjust the lighting.

By way of example, at least one lamp can be dimmed, chromatic coordinates can be modified, and/or at least one lamp can be activated or deactivated. Furthermore, building technology system components K1, K2, K3 can also be selected via the user interface when appropriate data has been stored in the data storage unit 8, which define the spatial resolution of the building technology components K1, K2, K3. The memory 8 can be accessed for this, for example, in which the building technology system components K1, K2, K3 associated with the parameter P are stored. The building technology system components K1, K2, K3 can also be depicted, for example, on the user interface in an image depicting the floor plan of a room, such that the user can select the building technology system components K1, K2, K3.

The building technology system components K1, K2, K3 can be accessible via identifiers. It is thus possible, for example, to query a remote server based on the at least one parameter P, regarding which building technology system components are available in a region of a building, which is identified via the at least one parameter P. The mobile communication terminal 1 then sends a query to the data storage unit 8, which can also be a remote data storage unit, or a cloud memory, and determines which building technology system components K1, K2, K3 are available in said region. This can be based on the identifier, for example, which has been sent to the data storage unit upon request. The queried data can be evaluated by the control unit SE or the software application 6 such that the building technology system components K1, K2, K3 are depicted symbolically, in particular, on a user interface. A user can then select an appropriate building technology system component K1, K2 and/or K3, and adjust the building technology system components K1, K2 and/or K3 via the functions 91, 92 depicted on the user interface. As a matter of course, groups of building technology system components K1, K2, K3 can also be activated.

In particular, the software application 6 is also configured to depict functions 91, 92 that correspond to a type of remote control on the user interface 9 based on the at least one parameter P. In this regard, a virtual remote control is depicted by the user interface 9, which is configured to the building technology system identified by the at least one parameter P. The software application 6 can also request data from sensors and actuators via the further communication channel, or depict corresponding data on the display unit 2, or by means of the user interface 9. Accordingly, parameters of these sensors can also be collectively depicted, evaluated, modified and/or set over a time interval.

Configurations and calibration data regarding building technology system components K1, K2, K3, e.g. bus subscribers, can also be transmitted to the building technology system GT by means of the user interface 9 and/or the software application 6. The near field communication interface 5 can be an NFC or RFID interface.

The building technology system GT has at least one near field communication interface 4, wherein the building technology system outputs at least one parameter P via the at least one near field communication interface 4. The parameter P can be modified thereby, such that a parameter P that is to be output can be configured by the building technology system GT. The parameter P can thus be modified and set via a central processing unit of the building technology system GT. In this regard, the building technology system also has at least one control unit (not shown), which enables an appropriate activation of the near field communication interface 4. In addition, a further communication interface 11 is likewise provided in the building technology system GT for receiving control data. The building technology system or the building technology system components K1, K2, K3 are then activated and/or configured based on the control data.

The building technology system outputs an identifier for the further communication channel as a parameter P, or as part of the at least one parameter P, in particular, which enables the mobile communication terminal 1 to communicate with the further communication interface of the building technology system. The building technology system GT thus configures the building technology system components K1, K2, K3, such as actuators, sensors and/or bus subscribers, or data transmitted by and/or to these components, based on the received control data.

The building technology system GT and the communication terminal 1 thus collectively form a system 100, such as that shown in FIG. 1.

What is claimed is:

1. A mobile communication terminal for a building technology system comprising:
   a display unit and an input unit;
   a near field communication interface;
   another wireless communication interface that does not utilize near field communication; and
   a control unit;
   wherein the control unit is configured to read out at least one parameter of a building technology system via the near field communication interface, and make it available to a software application executed by the mobile communication terminal, wherein the software application is configured to depict a user interface on the display unit based on the at least one parameter, and to evaluate a user input to the user interface via the input unit, and to send control data based on user input to the building technology system via said another wireless communication interface of the mobile communication terminal; and
   further wherein the building technology system controls a plurality of components and the user interface based on the at least one parameter k capable of controlling only one or more specific components of the plurality of components controlled by the building technology system;
   wherein the software application executed by the mobile communication terminal is configured to provide functions for controlling the building technology system, which have different levels of complexity and wherein the software application depicts the functions, through the user interface in groups according to complexity, and on numerous logical levels;
   wherein the control unit is configured to automatically open the software application when it reads the at least one parameter via the near field communication interface; and
   further wherein the software applications is configured to select the at least one further communication interface of the mobile communication terminal based on the at least one parameter, and to send the control data via the selected at least one further communication interface, and the software application is configured to determine an address or a type of address for an appropriate communication channel for the mobile communication terminal to communicate with the building technology system based on the parameter read out from the near field communication interface.

2. The mobile communication terminal according to claim 1, wherein the software application is configured to provide supplementary data (93) regarding the functions, and wherein the software application configured to depict the supplementary data through the user interface in association with the functions for controlling the building technology system and/or a user input.

3. The mobile communication terminal according to claim 1, wherein the functions are provided for creating, modifying and/or deleting a scenario configuration.

4. The mobile communication terminal according to claim 1, wherein the software application is configured to evaluate user input via the input unit, and to make the functions or a portion of the functions available after evaluation of a predefined user input.

5. The mobile communication terminal according to claim 1, wherein the mobile communication terminal accesses a data storage unit, which is configured to store user interface configurations, and wherein the control unit and/or the software application are configured to request at least one user interface configuration of the user interface configurations in association with the at least one parameter, and to depict the user interface in accordance with the at least one user interface configuration.

6. The mobile communication terminal according to claim 5, wherein the data storage unit is configured to store definitions of valid user inputs, and wherein the control unit and/or the software application are configured to request at least one defined valid user input in association with the at least one parameter, and to only send control data based on the at least one defined valid user input.

7. The mobile communication terminal according to claim 5, wherein the software application is configured to depict a type of remote control as the user interface based on the at least one type of addressing, which corresponds to a type of remote control provided for the building technology system, which can be identified, in particular, by the at least one parameter in the data storage unit.

8. The mobile communication terminal according to claim 1, wherein the at least one parameter defines valid user inputs, and wherein the software application configured to only depict the functions and accept inputs via the input unit for the valid user inputs.

9. The mobile communication terminal, according to claim 1, wherein the software application is configured to output sensor data through the user interface based on the at least one parameter.

10. The mobile communication terminal, according to claim 1, wherein the control data are configuration data, in particular for configuring actuators, sensors, and/or bus subscribers of the building technology system.

11. The mobile communication terminal according to claim 1, wherein the building technology system is a light and/or lighting system, wherein the near field communication interface is an RHD and/or NFC interface, and wherein said another wireless communication interface is a Bluetooth, \A LAN, and/or Zigbee interface.

12. A building technology system comprising:
a plurality of lights controlled by the building technology system;
at least one near field communication interface, wherein the building technology system is configured to output at least one parameter of the building technology system via the at least one near field communication interface;
a control unit; and
at least one further communication interface;
wherein the at least one parameter is provided to a mobile communication terminal within range of the near field communication interface in order to identify the building lighting system and necessary addressing data for the at least one further communication interface of the building lighting system; and
the control unit is configured to control the building technology system and in particular building technology system components which include the plurality of lights based on control data received via the at least one further communication interface from the mobile communication terminal and further wherein the building technology system controls a plurality of components and the user interface based on the at least one parameter P is capable of controlling only one or more specific components of the plurality of components controlled by the building technology system and the building technology system includes a bus and at least some of the components controlled by the building technology system are bus subscribers that are controlled via the user interface on the mobile communication terminal;
wherein a control unit of the mobile communication terminal is configured to automatically open a software application implementing a user interface based the at least one parameter via the near field communication interface, and the software application on the mobile communication terminal is configured to select the at least one further communication interface of the mobile communication terminal, based on the at least one parameter and to send the control data via the selected at least one further communication interface, and to determine the addressing data for the at least one wireless communication interface of the building technology system for the mobile communication terminal to communicate with the building technology system based on the parameter read out from the near field communication interface; and
wherein a user interface on the mobile communication terminal is configured to provide functions for controlling the building technology system, which have different levels of complexity and wherein the user interface on the mobile communication terminal depicts the functions through the user interfaced in groups according to complexity, and on numerous logical levels.

13. A system comprising a mobile communication terminal and a building technology system; wherein the mobile communication terminal comprises:
a display unit and an input unit;
a near field communication interface;
another wireless communication interface that does not utilize near field communication; and
a control unit;
wherein the control unit on the mobile communication device is configured to read out at least one parameter of a building technology system via the near field communication interface, and make it available to a software application executed by the mobile communication terminal, wherein the software application is configured to depict a user interface on the display unit based on the at least one parameter (P), and to evaluate a user input to the user interface via the input unit, and to send control data based on user input to the building technology system via said another wireless communication interface of the mobile communication terminal; and
wherein the building technology system comprises: at least one wireless communication interface that does not utilize near field communication;
at least one near field communication interface, wherein the building technology system is configured to output the at least one parameter via the at least one near field communication interface, wherein the at least one parameter is received by the mobile communication terminal when the mobile communication terminal is within range of the near field communication interface of the building technology system, and said at least one parameter identifies addressing data for the at least one wireless communication interface of the building technology system that does not utilize near field communication; and
a control unit;
a plurality of building technology system components including a plurality of lights;
wherein the control unit of the building technology system is configured to control and/or configure the building technology system components, based on control data received via the at least one wireless communication interface that does not utilize near field communication; and further wherein the user interface on the mobile communication terminal based on the at least one parameter is capable of controlling only one or more specific components of the plurality of building technology system components controlled by the control unit;
wherein the software application of the mobile communication terminal is configured to provide functions for controlling the building technology system, which have different levels of complexity and wherein the software application depicts the functions through the user interface in groups according to complexity, and on numerous logical levels; and
wherein the control unit of the mobile communication terminal is configured to automatically open the software application when it reads the at least one parameter via the near field communication interface; and
further wherein the software application is configured to select the at least one further communication interface of the mobile communication terminal, based on the at least one parameter, and to send the control data via the selected at least one further communication interface, and the software application is configured to determine an address or a type of address for an appropriate communication channel for the mobile communication terminal to communicate with the building technology system based on the parameter read out from the near field communication interface.

\* \* \* \* \*

UNITED STATES PATENT AND TRADEMARK OFFICE
CERTIFICATE OF CORRECTION

PATENT NO. : 11,126,339 B2
APPLICATION NO. : 16/085010
DATED : September 21, 2021
INVENTOR(S) : Dieter Severin Page 1 of 1

It is certified that error appears in the above-identified patent and that said Letters Patent is hereby corrected as shown below:

In the Claims

In Column 9, Claim 1, Line 60, delete "k" and insert -- P is --

In Column 11, Claim 11, Line 6, delete "RHD" and insert -- RFID --

In Column 11, Claim 11, Line 8, delete "\A LAN" and insert -- WLAN --

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*